(12) United States Patent  
McClure

(10) Patent No.: US 6,338,209 B1
(45) Date of Patent: Jan. 15, 2002

(54) TILLING MACHINE, METHOD OF USE AND METHOD OF GARDENING

(76) Inventor: David McClure, 80 Hartley Woods Dr., Kennesaw, GA (US) 30144

( * ) Notice: Subject to any disclaimer, the term of this patent is extended or adjusted under 35 U.S.C. 154(b) by 0 days.

(21) Appl. No.: 09/547,254

(22) Filed: Apr. 11, 2000

(51) Int. Cl.$^7$ .................................................. E02F 5/22
(52) U.S. Cl. ........................ 37/142.5; 37/410; 37/355; 172/42; 172/329
(58) Field of Search .......................... 37/352, 355, 357, 37/366, 367, 368, 142.5, 139, 462, 465, 347, 195, 403, 404, 410; 172/42, 107, 817, 329, 245, 247

(56) References Cited

U.S. PATENT DOCUMENTS

| | | | |
|---|---|---|---|
| 3,754,341 A | * | 8/1973 | Caldwell et al. |
| 4,055,126 A | | 10/1977 | Brown et al. |
| 4,103,441 A | | 8/1978 | Flippin |
| 4,230,054 A | | 10/1980 | Hatcher |
| 4,282,662 A | | 8/1981 | Zucco |
| 4,404,918 A | | 9/1983 | Whalen et al. |
| 4,429,477 A | * | 2/1984 | Tice et al. |
| 4,475,604 A | * | 10/1984 | Albertson et al. |
| 4,525,837 A | | 7/1985 | Tan et al. |
| 4,890,399 A | * | 1/1990 | Stiff et al. |
| 4,958,457 A | | 9/1990 | Doskocil |
| 4,987,689 A | * | 1/1991 | Kaczmarski et al. |
| 5,144,760 A | | 9/1992 | McGuire |
| 5,228,221 A | * | 7/1993 | Hillard et al. |
| 5,237,761 A | | 8/1993 | Nadeau et al. |
| 5,255,454 A | | 10/1993 | Pounds |
| RE35,088 E | | 11/1995 | Gilbert |
| 5,465,511 A | | 11/1995 | Umberson |
| 5,511,326 A | | 4/1996 | Liebecht, Jr. |
| 5,575,538 A | | 11/1996 | Gilbert et al. |
| 5,623,997 A | | 4/1997 | Rawson et al. |
| 5,813,151 A | * | 9/1998 | Stephens et al. |
| 5,873,186 A | | 2/1999 | Yoder et al. |
| 5,964,049 A | | 10/1999 | Dean et al. |
| 6,085,504 A | * | 7/2000 | Wright et al. |
| 6,098,385 A | * | 8/2000 | Turk |
| 6,151,811 A | * | 11/2000 | Barreto |
| 6,163,987 A | * | 12/2000 | Schommer |

* cited by examiner

Primary Examiner—Victor Batson
(74) Attorney, Agent, or Firm—Joel D. Myers; Myers & Associates Intellectual Property Law p.c.

(57) ABSTRACT

A trenching machine having independently driven wheels. Trenching machine comprises digging chain that moves between a raised position and a lowered position, a housing that is carried by a pair of front wheels and a pair of rear casters, a motor that independently drives front wheels to propel housing, and a guide wheel that aligns trenching machine with trench upon a second pass. Trenching machine also has a front plow and a rear plow that collect and deposit the dirt surrounding the trench into the trench. A method of gardening/landscaping wherein a trench is dug by a first pass, soil amendments are added to the trench, and then on the second pass, the excavated dirt is plowed back into the trench and then mixed with the amendments. A method of gardening/landscaping wherein vegetation cover between trenched rows is maintained thus utilizing only the ground area that is needed for planting.

20 Claims, 8 Drawing Sheets

TILLING MACHINE, METHOD OF USE AND METHOD OF GARDENING

FIELD OF THE INVENTION

The present invention relates generally to gardening devices and methods and more specifically to a trenching machine, method of use and method of gardening.

BACKGROUND OF THE INVENTION

Due to both the economical benefits and the personal gratification of having a successful garden, gardening has become enormously popular. Commercially and privately, gardens can be found in all parts of the world. Also equally, if not more important is the practice of landscaping. As such, improvements and new innovations to gardening/landscaping tools can have a universally enormous beneficial impact.

Every year, gardeners cultivate their gardens and landscapers plant new flowers, shrubs and trees. Generally, this is accomplished by manually digging or using a tiller. In view of the present invention, these methods, however, are disadvantageous. Manual digging is labor intensive, slow and thus, inefficient. A tiller is difficult to operate and requires a great deal of pushing or pulling in order to cultivate the soil. In addition, it is often difficult to cultivate to a predetermined depth consistently. Moreover, due to the design of known tillers, more soil is cultivated than is needed, resulting in wasted energy and space. For instance, it is often desirable to cultivate only a narrow (6 inches to 12 inches wide) trench to plant flowers, vegetables or the like. However, with a tiller, the minimum width that can be cultivated is usually 2 feet to 3 feet wide.

In large fields, a weighted trenching plow pulled by a tractor has been utilized for digging narrow trenches. However, this method also has many disadvantages. For instance, as is obvious, due to the size of most tractors, this method is not practicable for smaller gardens and landscaping. For these smaller applications, riding lawnmowers or minitractors are sometimes utilized to pull a lighter and smaller trenching plow. However, due to the limited power of these machines, the reduced weight of the digging plows and the hardness of the ground, it is often necessary to till the area prior to utilizing the digging plows.

Even if the ground is suitable and the area is of appropriate size for the above methods, these methods remain to be disadvantageous. More specifically, after the first pass with either a hoe or a digging plow, amendments are added to the trench and then it is necessary to manually mix the amendments or to replow. Unfortunately, however, manual mixing is labor intensive and replowing does not adequately mix the amendments with the evacuated dirt.

Therefore, it is readily apparent that there is a need for a device that can cultivate soil at a uniform depth, can efficient mix amendments with the evacuated soil and is easy to control and maneuver.

SUMMARY OF THE INVENTION

According to its major aspects and broadly stated, the present invention is a trenching machine and a method of gardening/landscaping. The trenching machine generally comprises a digging chain that moves between a raised position and a lowered position, a housing that is carried by a pair of front wheels and a pair of rear casters, a motor that independently drives front wheels to propel housing, swivel handles that allow the user to avoid straddling the trench, a guide wheel that aligns trenching machine with trench upon a second pass, and a front and rear closure plow that collects and deposits the surrounding dirt back into the trench.

Generally, on the first pass, the digging chain is engaged and then lowered until a desired depth is cut into the ground. The digging chain is then secured at this preferred position. As desired by the user, the handles may be swiveled to the side to allow the user to walk beside the machine and thus avoid the need to straddle the trench. Next, the left and right front wheels are engaged by depressing left and right squeeze bars thus propelling the machine forward. After the desired length of trench is achieved, the machine is easily rotated 180 degrees by releasing one of the squeeze bars, thereby allowing only one front wheel to rotate. With the digging chain down, the machine will pivot about the digging chain within an extremely small radius. Amendments, such as fertilizer, lime, topsoil, peat moss and the like can then be added to the trench as desired.

On the second pass, the front and rear closure plows are lowered to contact the ground or to be in close proximity therewith. The guide wheel can then be lowered within the trench to assist in guiding the machine along the trench. Again the squeeze bars are depressed and the machine moves forward. As the machine moves down the trench, the front closure plows push the dirt evacuated on the first pass back into the trench and the digging chain mixes the amendments with the plowed dirt. The rear plows then push any remaining dirt or any dirt that was evacuated during the mixing back into the trench.

One of the major features of the present invention is the independently driven wheels. With independently driven wheels, the trenching machine has a sharp turning radius. The trenching machine can be rotated about 360 degrees. As a result, the trenching machine is much more versatile than trenching machines that can only be propelled in an approximately straight line.

Another important feature of the present invention are the front and rear closure plows. Instead of being required to fill the trench by a different instrument, the plows collect and deposit the dirt back into the trench so that additional work is not required. Consequently, the trenching machine is much more efficient than prior art trenchers.

Another important feature of the present invention is the ability to rotate the handle assembly about a horizontal plane. With the handle assembly rotated to a nonparallel position relative to the trenching machine housing, the user is able to propel the trenching machine without straddling the trench.

Another important feature of the present invention is the ability to rotate the handle assembly in a horizontal plane. With the handle assembly rotated to a nonparallel position relative to the trenching machine housing, the user is able to propel the trenching machine without straddling the trench.

Another important feature of the present invention is the adjustable digging chain. The digging chain can be placed in a plurality of position thereby resulting in the possibility of a multitude of digging depths.

Another important feature of the present invention is the roller guide for guiding the trenching machine on the second pass. Prior to starting the second pass, the roller guide can be lowered into the trench. The horizontally positioned roller is in close proximity to the edges of the trench thereby reducing the amount of free play and thus guiding the trenching machine within the trench.

Another important feature of the present invention is the new and improved method of gardening/landscaping that maintains the vegetation cover between trenched rows thus utilizing only the ground area that is needed. Soil amendments are needed only in the open trench and not in the row middles, thus using only a fraction of amendments utilized in other methods.

Another important feature of the present invention is the new and improved method of gardening/landscaping that facilitates the installation of below ground drip or trickle irrigation lines without the need to make separate digs. Drip or trickle irrigation lines can be installed after the second pass wherein the rear closure plows are raised in the up position, thus leaving the trench open. A third pass can be performed to close the trench wherein the digging chain in the raised disengaged position and the front and/or rear plows are in the lowered position.

Another important feature of the present invention is the new and improved method of gardening/landscaping that maintains the vegetation cover between trenched rows thus allowing entry into the garden during rainy periods without becoming muddy.

Another important feature of the present invention is the new and improved method of gardening/landscaping that allows gardening/landscaping on sloped ground by maintaining the vegetation cover between trenched rows thus resulting in less erosion.

These and other objects, features and advantages of the invention will become more apparent to one skilled in the art from the following description and claims when read in light of the accompanying drawings.

DETAILED DESCRIPTION OF PREFERRED EMBODIMENTS

Figure 1:
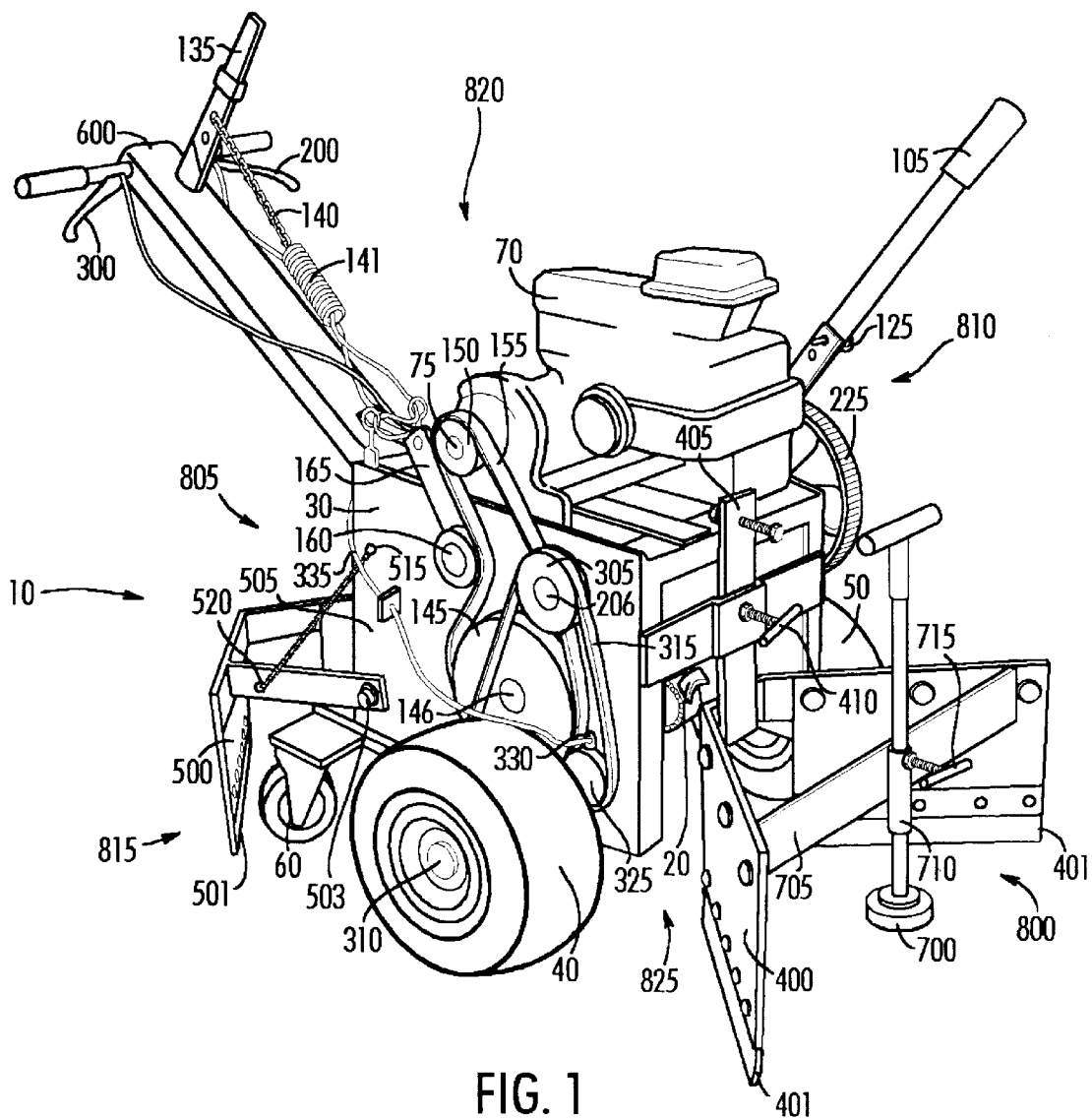
FIG. 1 is a perspective view of a trenching machine, according to a preferred embodiment of the present invention.

In describing the preferred embodiment of the present invention illustrated in the figures, specific terminology is employed for the sake of clarity. The invention, however, is not intended to be limited to the specific terminology so selected, and it is to be understood that each specific element includes all technical equivalents that operate in a similar manner to accomplish similar functions.

With regard to all such embodiments as may be herein described and contemplated, it will be appreciated that optional features, including, but not limited to, aesthetically pleasing coloration and surface design, and labeling and brand marking, may be provided in association with the present invention, all without departing from the scope of the invention.

The present invention is a trenching machine and a method of gardening/landscaping. Referring now to the figures, there is shown a preferred embodiment of the trenching machine, indicated generally by reference numeral 10. In terms of orientation, trenching machine 10 has a front end 800, an opposing rear end 805, a left side 810, an opposing right side 815, a top 820 and an opposing bottom 825. Trenching machine 10 generally comprises digging chain 20 that moves between a raised position and any one of a plurality of lowered digging positions, a housing 30 that is carried by a pair of front wheels 40, 50 and a pair of rear casters 60, a motor 70 that independently drives front wheels 40, 50, a guide 700, front plows 400 and rear plows 500.

Figure 2:
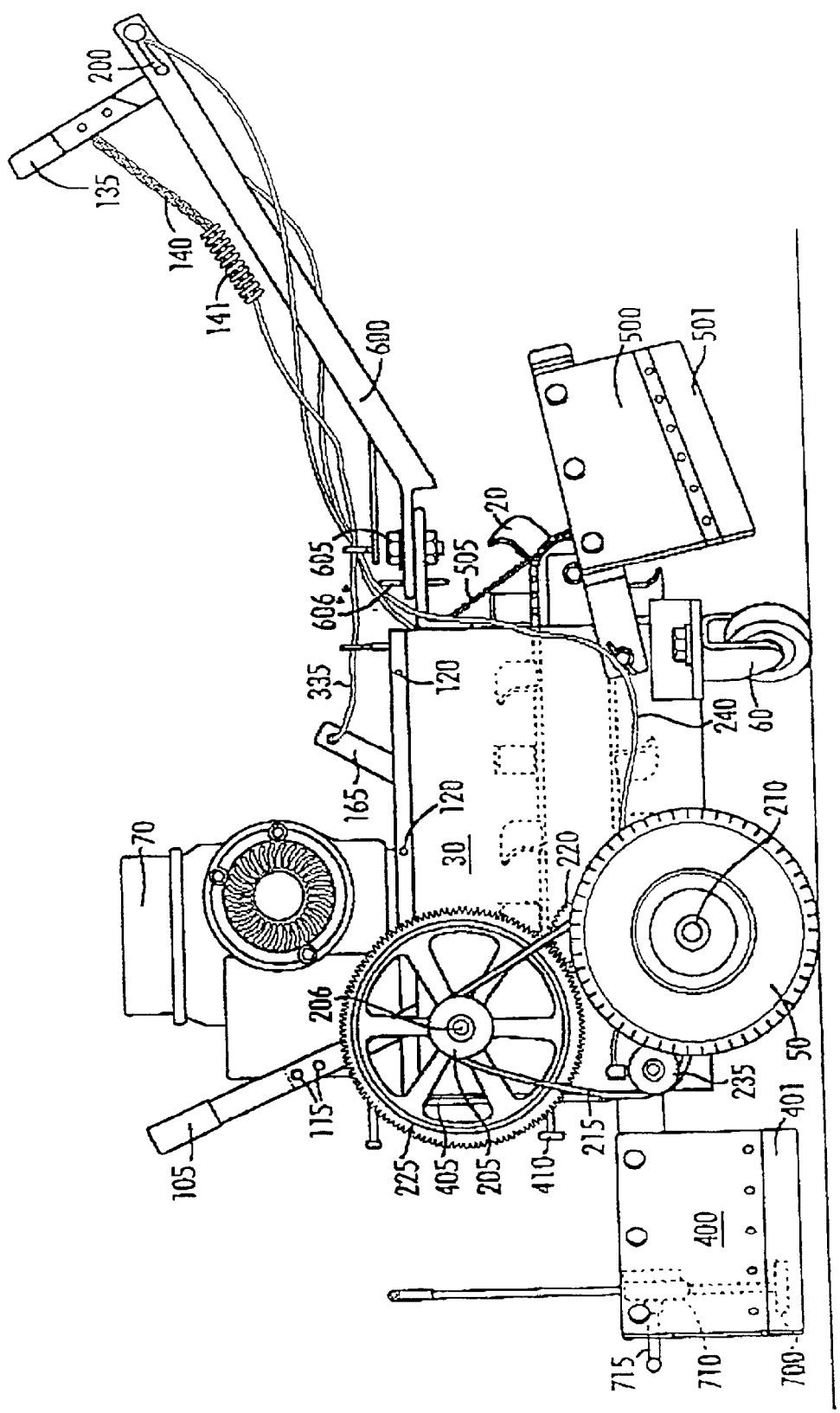
FIG. 2 is a left side view of a trenching machine with the digging chain in the raised position, according to a preferred embodiment of the present invention.
Figure 3:
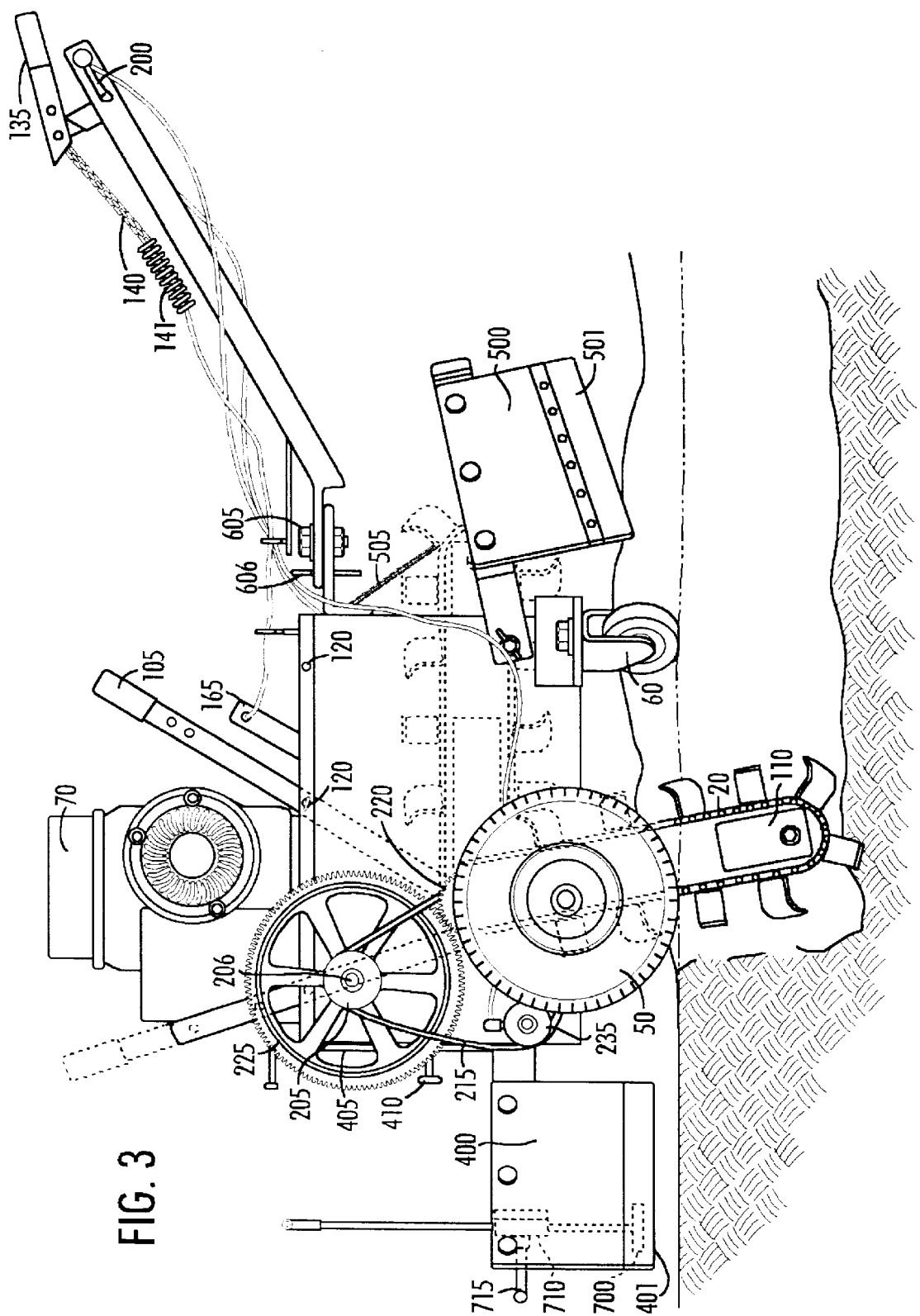
FIG. 3 is a left side view of a trenching machine with the digging chain in a lowered position, according to a preferred embodiment of the present invention.
Figure 4:
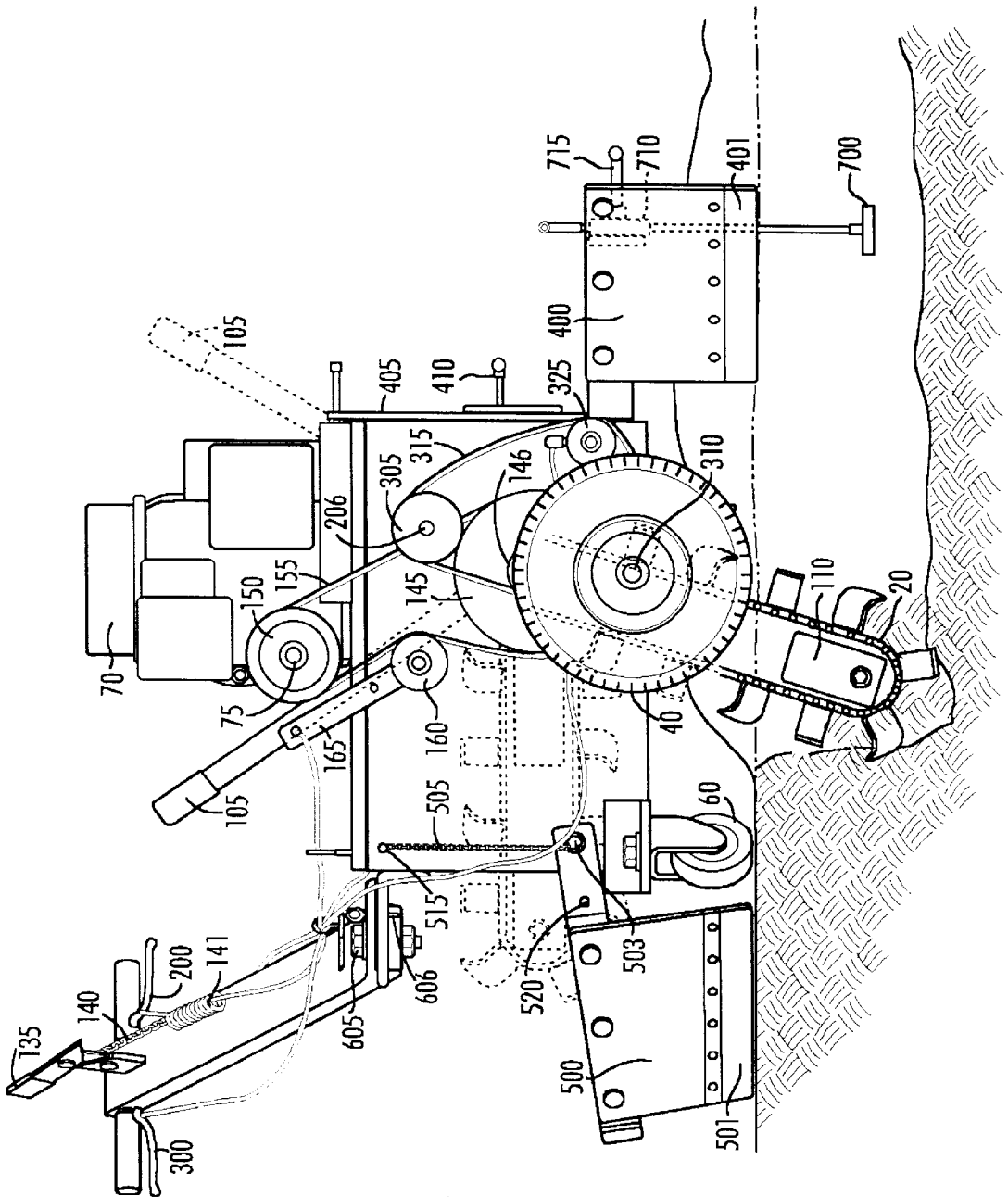
FIG. 4 is a right side view of a trenching machine with the digging chain in a lowered position, according to a preferred embodiment of the present invention.
Figure 8B:
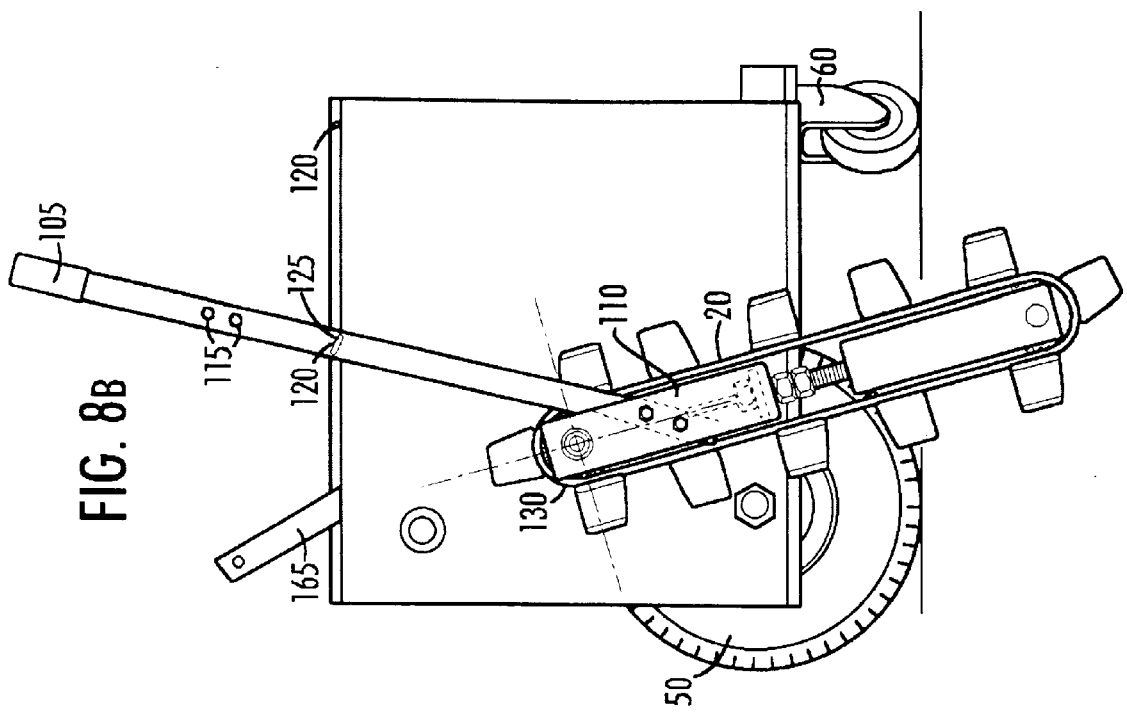
FIG. 8B is a detailed view of the digging chain in a lowered position, according to a preferred embodiment of the present invention.
Figure 8A:
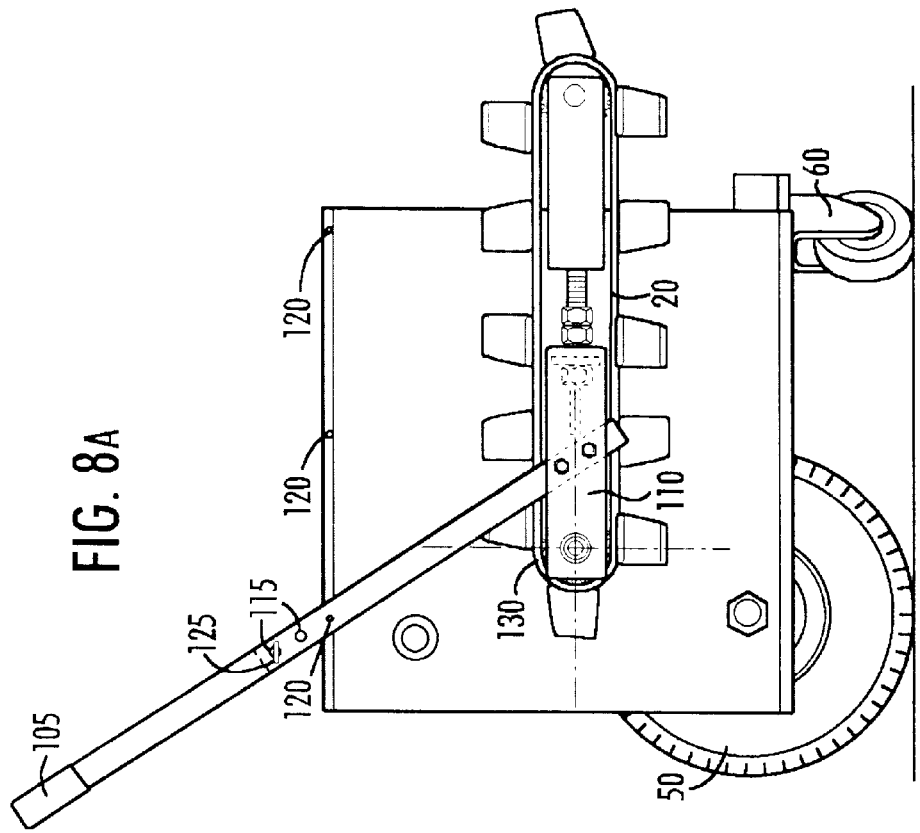
FIG. 8A is a detailed view of the digging chain in a raised position, according to a preferred embodiment of the present invention.

A digging chain 20 is capable of moving between a raised position illustrated in FIGS. 2 and 8A and a plurality of lowered digging positions illustrated in FIGS. 3, 4 and 8B. Movement of digging chain 20 is controlled by a lever 105. As seen in FIGS. 8A and 8B, lever 105 is attached to yoke 110 of digging chain 20, so that rotational movement of lever 105 in turn rotates digging chain 20. Lever 105 is capable of pivoting between a first position illustrated in FIG. 2, which corresponds to the maximum raised position of digging chain 20, and a second position illustrated in FIG. 4, which corresponds to the maximum lowered position of digging chain 20. In order to lock lever 105 in place, lever holes 115 in lever 105 are aligned with one of respective holes 120 in housing 30 and a lever pin 125 is placed therethrough. In order to set the depth of digging chain 20, lever 105 may also be locked into a position between first position and second position. Housing 30 contains a plurality of hole 120s that can be aligned with lever holes 115 in lever 105, so that lever 105 may be locked into place at any angle between first position and second position. Consequently, the depth of digging chain 20 depends upon the position of lever 105.

Figure 6:
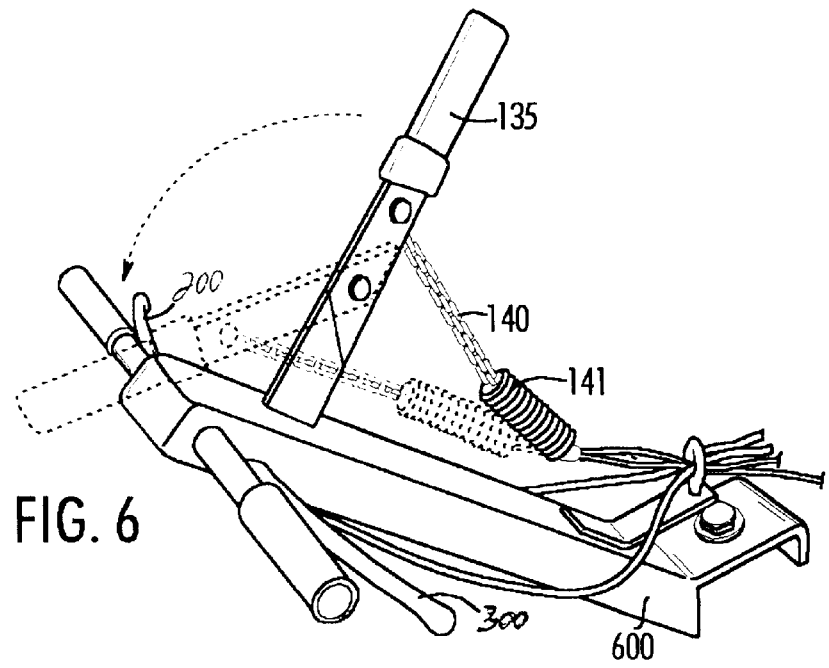
FIG. 6 is a detailed view of the handle assembly of a trenching machine, according to a preferred embodiment of the present invention.

In order to dig into the ground, an endless digging chain 20 is capable of rotation. The rotation of digging chain 20 is controlled by the position of bar 165, which in turn is controlled by the position of engagement lever 135. Engagement lever 135 is capable of rotating between a raised position and a lowered position as illustrated in FIG. 6. Engagement lever 135 is connected to bar 165 using a wire 140 and a tension spring 141. Bar 165 is capable of moving between an engaged position and a disengaged position. In the engaged position, digging chain 20 rotates; however, digging chain 20 does not rotate when bar 165 is in the disengaged position. If engagement lever 135 is in a lowered position, wire 140 will urge bar 165 into an engaged position to cause digging chain 20 to rotate. In the raised position, however, engagement lever 135 moves bar 165 into a disengaged position. Because the lowered position of engagement lever 135 is below the horizontal connection point of the tension spring 141, the tension spring 141 provides sufficient downward force on engagement lever 135 to maintain engagement lever 135 in the lowered position. Although a spring is disclosed for maintaining the engagement lever in the desired position, many other known means such as, for exemplary purposes only, aperture and protrusion, tongue and groove, retaining flanges and the like, may be utilized. The engagement and disengagement of digging chain 20 is described more fully below.

Referring to FIGS. 1–4, 8A and 8B, the rotational power of trenching machine 10 is generated by motor 70. Motor 70 is preferably a small gasoline powered engine of the type commonly available having a reduction gearbox and a motor output shaft 75. The rotational power generated by motor 70 is transferred to digging chain 20 via motor output pulley 150, first belt 155, main drive pulley 145, main drive shaft 146 and digging chain gear 130. More specifically, motor output shaft 75 rotates motor output pulley 150. Motor output pulley 150 drives first belt 155 which in turn rotates main drive pulley 145 and thus main drive shaft 146. Concentrically attached to main drive shaft 146 is digging chain gear 130. Therefore, main drive shaft 146 rotates digging chain gear 130 which in turn engages digging chain 20 thereby rotating digging chain 20.

The tension of first belt 155 is controlled by belt tensioning pulley 160, bar 165, tension spring 141, wire 140 and engagement lever 135. Belt tensioning pulley 160 is capable of moving between a tensioned position when bar 165 is in an engaged position and a relaxed position when bar 165 is in a disengaged position. In a tensioned position, first belt 155 causes sufficient friction so that rotation of motor output pulley 150 causes rotation of main drive pulley 145 via first belt 155; however, first belt 155 does not have sufficient tension when digging belt tension pulley is in the relaxed position to translate the rotation of motor output pulley 150 to main drive pulley 145. Attached to belt tensioning pulley 160 is bar 165. Bar 165 is connected to engagement lever 135 using wire 140 and tension spring 141. The movement of engagement lever 135 moves bar 165, which in turn, controls the position of belt tensioning pulley 160.

Trenching machine 10 is self-propelled by rotation of front left wheel 50 and front right wheel 40, which are independently driven. The rotation of front left wheel 50 is controlled by right tensioning lever 300 while the rotation of front right wheel 40 is controlled by left tensioning lever 200. Front left wheel 50 rotates when right tensioning lever 300 is depressed; front right wheel 40 rotates when left tensioning lever 200 is depressed. In order to turn trenching machine 10 left, left tensioning lever 200 is depressed. Likewise, trenching machine 10 turns right by depressing right tensioning lever 300. In order to propel trenching machine 10 in a relatively straight line, both left tensioning lever 200 and right tensioning lever 300 are depressed simultaneously. The propelling and turning speed of trenching machine 10 can be varied by varying the amount left tensioning lever 200 and right tensioning lever 300 are depressed, respectively.

The rotational power generated by motor 70 is transferred to the front left wheel 50 via motor output shaft 75, motor output pulley 150, first belt 155, main drive pulley 145, main drive shaft 146, first gear 220, second gear 225, first pulley 205, second belt 215 and left wheel pulley (not shown). Front left wheel 50 having left wheel pulley attached thereto is known and readily available. Although a wheel/pulley combination is preferred, in an alternate embodiment, a separate pulley attached to a shaft carried by the wheel may be utilized. Other known means for transferring power to front left wheel 50 may be used.

More specifically, motor output shaft 75 rotates motor output pulley 150. Motor output pulley 150 drives first belt 155 which in turn rotates main drive pulley 145 and thus main drive shaft 146. Concentrically attached to main drive shaft 146, on the left side 810 of housing 30, is gear 220, thus shaft 146 rotates gear 220. Gear 220 has a plurality of teeth on its periphery that are mated to the teeth of gear 225 thereby rotating gear 225. Gear 225 rotates shaft 206 thereby rotating pulley 205. Pulley 205 in turn drives second belt 215 which drives left wheel pulley attached concentrically with front left wheel 50, and thus rotates front left wheel 50.

The tension of second belt 215 is controlled by a left wheel tensioning pulley 235. Left wheel tensioning pulley 235 is capable of moving between a tensioned position when right tensioning lever 300 is depressed and a relaxed position when right tensioning lever 300 is not depressed. In a tensioned position, second belt 215 causes sufficient tension in second belt 215 so that the left wheel pulley is rotated by second belt 215 thereby front left wheel 50; however, second belt 215 does not have sufficient tension when left wheel tension pulley 235 is in the relaxed position to translate the rotation of pulley 205 to the left wheel pulley. A left wheel positioning bar is attached to left wheel tensioning pulley 235, which in turn is connected to right tensioning lever 300 using left wheel wire 240. The speed of front left wheel 50 may be varied by varying the amount right tensioning lever 300 is depressed. When left wheel tension pulley 235 is not in the fully tensioned position, left wheel input pulley 205 partially slips about second belt 215, thus causing a slower rotation of front left wheel 50.

The rotational power generated by motor 70 is transferred to the front right wheel 40 via motor output shaft 75, motor output pulley 150, first belt 155, main drive pulley 145, main drive shaft 146, first gear 220, second gear 225, shaft 206, pulley 305, third belt 315, and right wheel pulley (not shown). Front right wheel 40 having right wheel pulley attached thereto is known and readily available. Although a wheel/pulley combination is preferred, in an alternate embodiment, a separate pulley attached to a shaft carried by the wheel may be utilized. Other known means for transferring power to front right wheel 40 may be used.

More specifically, motor output shaft 75 rotates motor output pulley 150. Motor output pulley 150 drives first belt 155 which in turn rotates main drive pulley 145 and thus main drive shaft 146. Concentrically attached to main drive shaft 146, on the left side 810 of housing 30, is gear 220, thus shaft 146 rotates gear 220. Gear 220 has a plurality of teeth on its periphery that are mated to the teeth of gear 225 thereby rotating gear 225. Gear 225 rotates shaft 206, wherein shaft 206 extends to right side 815. Shaft 206 thereby rotates pulley 305 which in turn drives third belt 315 which drives right wheel pulley attached concentrically with front right wheel 40, and thus rotates front right wheel 40.

The tension of third belt 315 is controlled by a right wheel tensioning pulley 325. Right wheel tensioning pulley 325 is capable of moving between a tensioned position when left tensioning lever 200 is depressed and a relaxed position when left tensioning lever 200 is not depressed. In a tensioned position, right wheel tension pulley 325 causes sufficient tension in third belt 315 so that the right wheel pulley is rotated by third belt 315 thereby rotating front right wheel 40; however, third belt 315 does not have sufficient tension when right wheel tension pulley 325 is in the relaxed position to translate the rotation of pulley 305 to right wheel pulley and thus front right wheel 40. A right wheel positioning bar is attached to right wheel tensioning pulley 325, which in turn is connected to left tensioning lever 200 using right wheel wire 335. The speed of front right wheel 40 may be varied by varying the amount left tensioning lever 200 is depressed. When right wheel tension pulley 325 is not in the fully tensioned position, pulley 305 partially slips about third belt 315, thus causing a slower rotation of front right wheel 40.

Figure 7:
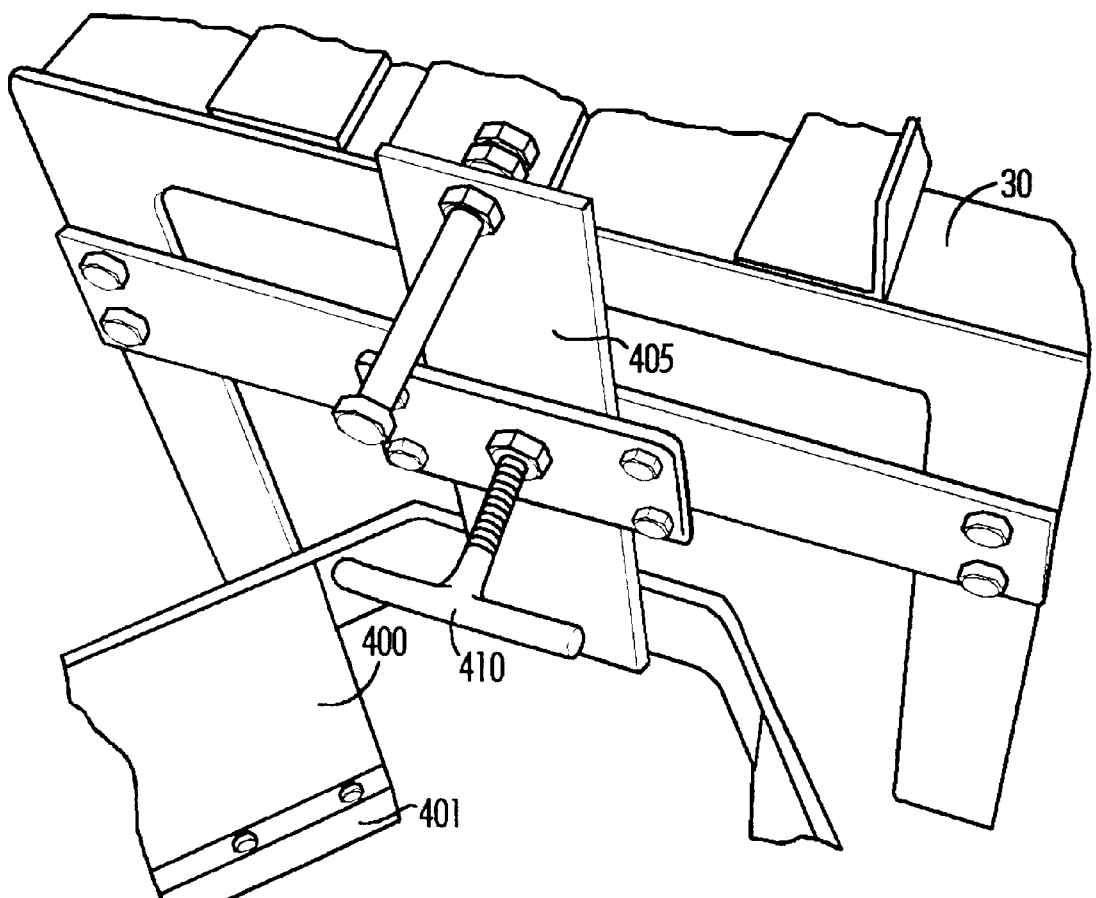
FIG. 7 is a detailed view of the front plow assembly of a trenching machine, according to a preferred embodiment of the present invention.

A front plow 400 and rear plow 500 are carried by housing 30. Both front plow 400 and rear plow 500 can be moved between a raised position as illustrated in FIG. 2 and a lowered position as illustrated in FIG. 4. Front plow 400 is attached to housing 30 using a member 405 that is slidably received within housing 30. A T-handle bolt 410 engages member 405 to lock front plow 400 into a desired position as best illustrated in FIG. 7. Rear plow 500 is maintained in a raised position by using a chain 505. Chain 505 has a latch on each end with one latch attached to a hole 515 in housing 30 and the other latch attached to a hole 520 in rear plow 500. Flexible rubber strips 401 and 501 are attached to front plow 400 and rear plow 500, respectively, to provide some flexibility if the plows 400, 500 come into contact with a rock, stump or the like. Thus, flexible rubber strips 401, 501 will flex to allow the object to pass under the respective plow 400, 500.

Figure 5:
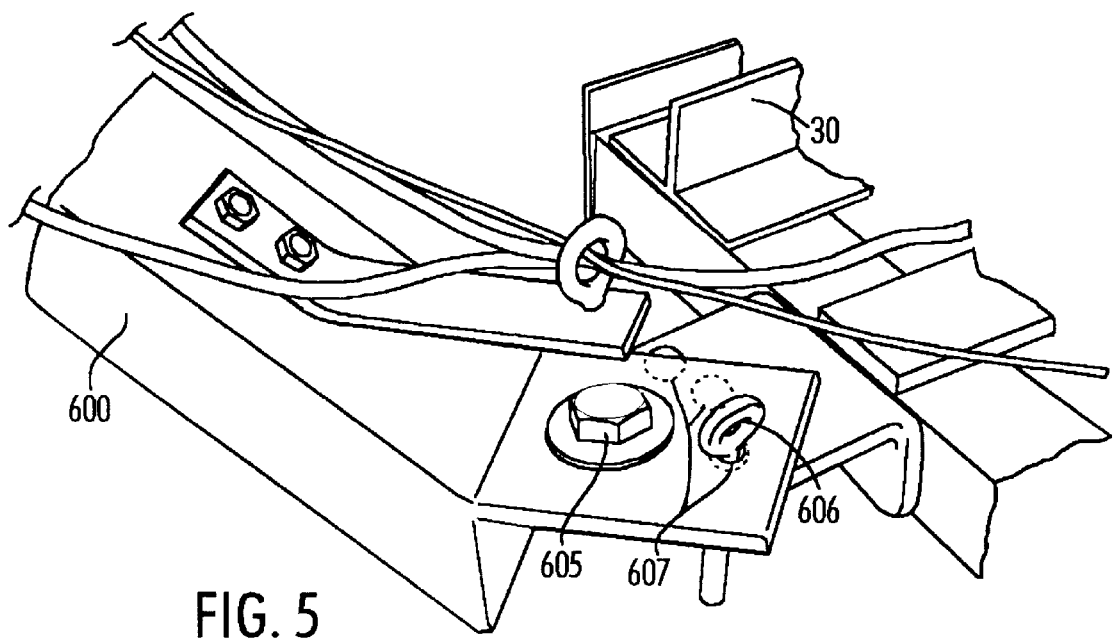
FIG. 5 is a detailed view of the junction between the frame and handle assembly of a trenching machine, according to a preferred embodiment of the present invention.

Referring to FIG. 5, handle assembly 600 is capable of rotating in a horizontal plane so that a user will not need to straddle the trench created by trenching machine 10. Handle assembly 600 is connected to housing 30 such that handle assembly 600 is capable of rotating about bolt 605. Handle assembly 600 is secured into position by pin 606 and into one of various apertures 607 to provide a multitude of operating positions.

Referring to FIG. 1, a guide 700 is mounted on front plow 400 in order to keep trenching machine aligned with a previously created trench. Guide 700 is mounted to front plow 400 via cross-bar 705. Cross-bar 705 has a sleeve 710 capable of slidably receiving guide 700. A guide bolt 715 is capable of frictionally engage guide 700 so that guide 700 can be secured into a desired position.

In use, on the first pass, digging chain 20 is engaged and then lowered until a desired depth is cut into the ground. Digging chain 20 is then secured at this preferred position by rotating lever 105. As desired by the user, handle assembly 600 may be swiveled to the side to allow the user to walk beside trenching machine 10 and thus avoid the need to straddle the trench. Next, front left wheel 50 and front right wheel 40 are engaged by depressing right tensioning lever 300 and left tensioning lever 200, respectively thus propelling trenching machine 10 forward. After the desired length of trench is achieved, trenching machine 10 is easily rotated 180 degrees by releasing either the right tensioning lever 300 or left tensioning lever 200, thereby allowing only one front wheel 40, 50 to rotate. With digging chain 20 down, trenching machine 10 will pivot about digging chain 20 within an extremely small radius. Amendments, such as fertilizer, lime, top soil, peat moss and the like can then be added to the trench as desired.

On the second pass, front plow 400 and rear plow 500 are lowered to contact the ground or to be in close proximity therewith. Guide 700 can then be lowered within the trench to assist in guiding trenching machine 10 along the trench. Again, right tensioning lever 300 and left tensioning lever 200 are depressed and trenching machine 10 moves forward. As trenching machine 10 moves down the trench, front plow 400 push the dirt evacuated on the first pass back into the trench and digging chain 20 mixes the amendments with the plowed dirt. Rear plow 500 then pushes any remaining dirt or any dirt that was evacuated during the mixing back into the trench.

By utilizing the system taught by use of the present device, a new and improved method of gardening/landscaping is disclosed. The method is not limited to use only by the present device; other equipment may be used to practice this method. The method of gardening/landscaping comprises maintaining the vegetation cover between trenched rows thus utilizing only the ground area that is needed. In other words, under prior methods, an entire area is tilled or cultivated and then plants, vegetables, flowers or the like are either planted in the tilled area or additionally, rows are trenched within the tilled or cultivated area. Thus, a large amount of ground is tilled or cultivated that is not utilized for planting. As a result of the present method, soil amendments are needed only in the open trench and not in the row middles, thus using only a fraction of amendments utilized in other methods. Additionally, the present method allows entry into the garden during rainy periods by providing a vegetative covered area between the rows that reduces the likelihood of mud. Moreover, the present invention allows gardening/landscaping on sloped ground by maintaining the vegetation cover between trenched rows thus resulting in less erosion. Additionally, the installation of below ground drip or trickle irrigation lines are facilitated without the need to make separate digs.

Figure 9:
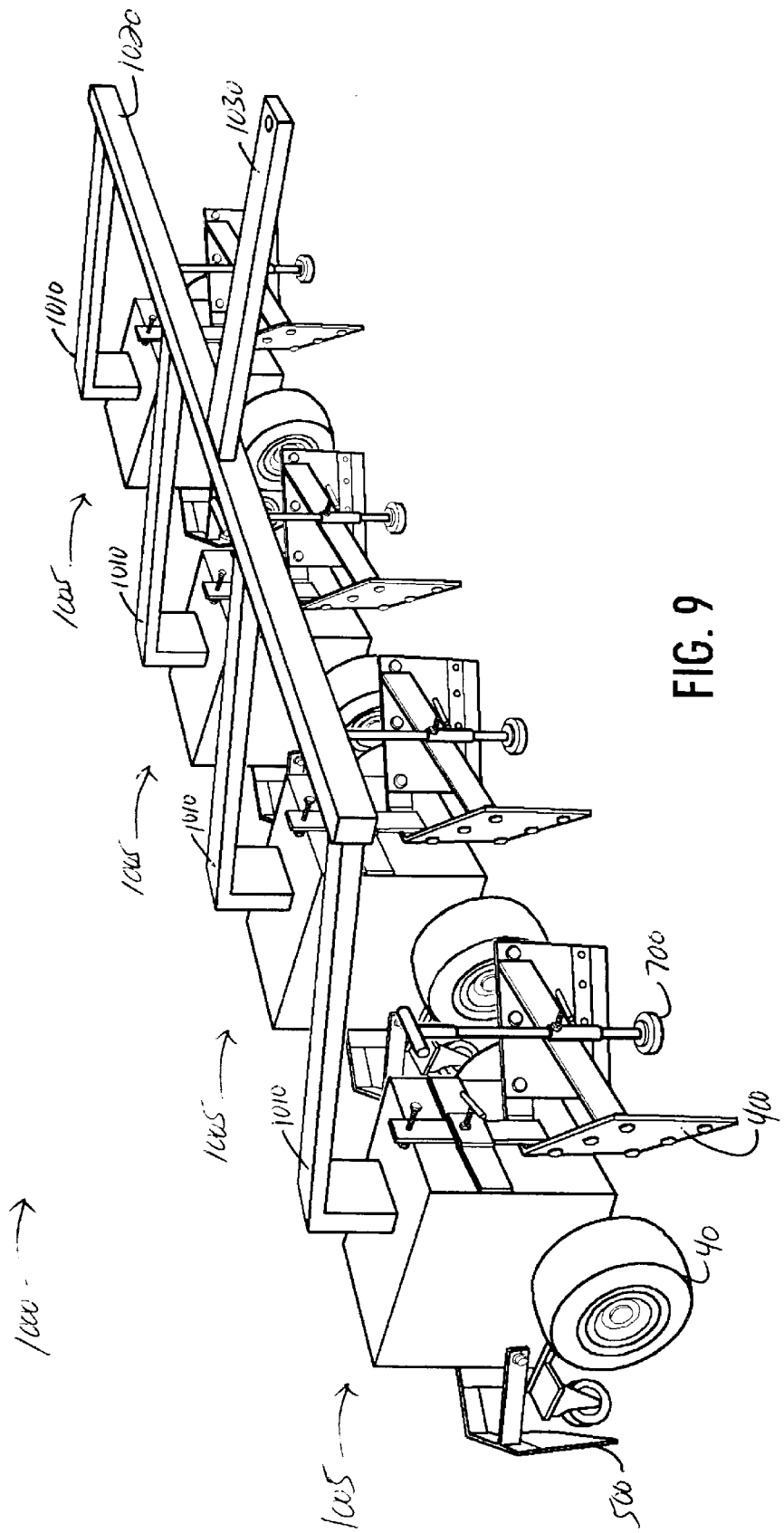
FIG. 9 is a perspective view of an alternate embodiment according to a preferred embodiment of the present invention.

Now referring to FIG. 9, there is shown an alternate embodiment 1000 of the present invention wherein a plurality of devices 1005 are attached to a distribution beam 1020 via connecting beams 1010. Attached to and extending from distribution beam 1020 is hitch beam 1030 for attaching the assembly to a tractor or other movement producing device. Front and rear plows, 400, 500 and guide 700, as described above, are incorporated. As such, alternate embodiment 1000 may be utilized a by commercial farmers to close dug trenches. As an additional alternative, a rigid trenching plow, known within the art, may be incorporated therein to provide a means to dig trenches as the assembly is pulled. It is also contemplated that the preferred embodiment, trenching machine 10, may be attached to a tractor individually or in multiples.

It should be noted that one skilled in the art would appreciate that the range of rotational speed of front right wheel 40 and front left wheel 50 can be varied by varying the speed of the motor output and/or by various gear ratios. It should also be noted that the rotational speed of digging chain 20 can be varied by varying the speed of the motor output and/or by various gear ratios.

Although the preferred embodiment of the present invention is described herein utilizing a gas powered small engine, any known source of rotational power such as, for exemplary purposes only, electric motors, diesel engines or solar powered motors, may be utilized.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. A trenching machine comprising:
   a housing having a front end and a rear end;
   digging means carried by said housing for digging a trench into the ground, said digging means positioned near said front end of said housing;
   propelling means carried by said housing for moving said housing;

a first plow carried by said front end of said housing; and a second plow carried by said rear end of said housing, said first plow and said second plow collecting dirt surrounding the trench and depositing the dirt into the trench.

2. The trenching machine of claim 1, further comprising a right wheel and a left wheel carried by said housing, said propelling means capable of independently driving said left without driving said right wheel.

3. The trenching machine of claim 1, further comprising a right wheel and a left wheel carried by said housing, said propelling means capable of independently driving said right without driving said left wheel.

4. The trenching machine of claim 1, further comprising a right wheel and a left wheel carried by said housing, said propelling means capable of independently driving said left wheel such that said housing is rotated in a horizontal plane in a clock-wise direction.

5. The trenching machine of claim 1, further comprising a right wheel and a left wheel carried by said housing, said propelling means capable of independently driving said right wheel such that said housing is rotated in a horizontal plane in a counter clock-wise direction.

6. The trenching machine of claim 1, further comprising a guide capable of being received by the trench.

7. The trenching machine of claim 1, further comprising a handle assembly, said handle assembly capable of rotating in a horizontal plane.

8. A trenching machine comprising:

a housing having a front end and a rear end;

digging means carried by said housing for digging a trench into the ground, said digging means positioned near said front end of said housing;

propelling means carried by said housing for moving said housing;

a first plow carried by said front end of said housing, said first plow and a second plow collecting dirt surrounding the trench and depositing the dirt into the trench;

a second plow carried by said rear end of said housing, said second plow collecting dirt surrounding the trench and depositing the dirt into the trench;

a handle assembly, said handle assembly capable of rotating in a horizontal plane; and a guide capable of being received by the trench.

9. The tilling machine of claim 8, further comprising a right wheel and a left wheel carried by said housing, said propelling means capable of independently driving said left without driving said right wheel.

10. The tilling machine of claim 8, further comprising a right wheel and a left wheel carried by said housing, said propelling means capable of independently driving said right without driving said left wheel.

11. The tilling machine of claim 8, further comprising a right wheel and a left wheel carried by said housing, said propelling means capable of independently driving said left wheel such that said housing is rotated in a horizontal plane in a clock-wise direction.

12. The tilling machine of claim 8, further comprising a right wheel and a left wheel carried by said housing, said propelling means capable of independently driving said right wheel such that said housing is rotated in a horizontal plane in a counter clock-wise direction.

13. A tilling machine comprising:

a housing;

digging means carried by said housing for digging a trench into the ground;

propelling means carried by said housing for moving said housing, said propelling means capable of rotating said housing in a horizontal plane;

a first plow carried by said housing; and a second plow carried by said housing, said first plow and said second plow for filling the trench.

14. The tilling machine of claim 13, further comprising a right wheel and a left wheel carried by said housing, said propelling means capable of independently driving said left without driving said right wheel.

15. The tilling machine of claim 13, further comprising a right wheel and a left wheel carried by said housing, said propelling means capable of independently driving said right without driving said left wheel.

16. The tilling machine of claim 13, further comprising a right wheel and a left wheel carried by said housing, said propelling means capable of independently driving said left wheel such that said housing is rotated in a horizontal plane in a clock-wise direction.

17. The tilling machine of claim 13, further comprising a right wheel and a left wheel carried by said housing, said propelling means capable of independently driving said right wheel such that said housing is rotated in a horizontal plane in a counter clock-wise direction.

18. The tilling machine of claim 13, further comprising a guide capable of being received by the trench.

19. The tilling machine of claim 13, further comprising a handle assembly, said handle assembly capable of rotating in a horizontal plane.

20. A method of gardening, comprising the steps of:

a. obtaining a tilling machine comprising a housing having a front end and a rear end; digging means carried by said housing for digging a trench into the ground, said digging means positioned near said front end of said housing; propelling means carried by said housing for moving said housing; a first plow carried by said front end of said housing; and a second plow carried by said rear end of said housing, said first plow and said second plow collecting dirt surrounding the trench and depositing the dirt into the trench; and b. digging at least one elongated trench in an untilled ground area utilizing said trenching machine.

* * * * *